US009010741B2

(12) United States Patent
Viault et al.

(10) Patent No.: US 9,010,741 B2
(45) Date of Patent: Apr. 21, 2015

(54) SUSPENSION BUMP STOP AND STRUT DEVICE

(75) Inventors: Samuel Viault, Tours (FR); Yves-André Liverato, St Paterne Racan (FR); Cédric Brulard, Charentilly (FR); Guy Heck, Mettray (FR)

(73) Assignee: Aktiebolaget SKF, Gothenburg (SE)

( * ) Notice: Subject to any disclaimer, the term of this patent is extended or adjusted under 35 U.S.C. 154(b) by 669 days.

(21) Appl. No.: 13/057,080

(22) PCT Filed: Jul. 29, 2009

(86) PCT No.: PCT/EP2009/059799
§ 371 (c)(1),
(2), (4) Date: Feb. 1, 2011

(87) PCT Pub. No.: WO2010/012766
PCT Pub. Date: Feb. 4, 2010

(65) Prior Publication Data
US 2011/0133379 A1   Jun. 9, 2011

(30) Foreign Application Priority Data
Aug. 1, 2008 (FR) .................. 08 55334

(51) Int. Cl.
*F16F 7/00* (2006.01)
*B60G 15/06* (2006.01)
(Continued)

(52) U.S. Cl.
CPC ........ *B60G 15/068* (2013.01); *B60G 2204/128* (2013.01); *B60G 2204/418* (2013.01); *B60G 2204/45021* (2013.01); *F16C 19/10* (2013.01); *F16C 33/761* (2013.01); *F16C 35/04* (2013.01); *F16C 2326/05* (2013.01)

(58) Field of Classification Search
USPC ................... 267/217, 219, 220; 384/609–617
See application file for complete search history.

(56) References Cited

U.S. PATENT DOCUMENTS 4,805,886 A * 2/1989 Hassan ................... 267/220
5,467,971 A * 11/1995 Hurtubise et al. ............ 267/220
(Continued)

FOREIGN PATENT DOCUMENTS

EP 0985565 A1 3/2000
EP 1445129 A1 8/2004
(Continued)

*Primary Examiner* — Robert A Siconolfi
*Assistant Examiner* — James Hsiao
(74) *Attorney, Agent, or Firm* — Bryan Peckjian; SKF USA Inc. Patent Dept.

(57) ABSTRACT

The suspension bump stop device comprises a rolling bearing (44) that forms an axial bump stop, equipped with an upper ring (46), with a lower ring (48) and with a plurality of rolling elements positioned between the rings, the upper and lower rings being supported respectively by an upper cup (40) and a lower cup (42), the lower cup forming a bearing means for a suspension spring (18), at least one sealing lip being provided on one of the cups so that it bears against a bearing surface portion of the other cup. The bearing surface portion is substantially cylindrical, the sealing lip being directed downwards away from the rolling bearing and bearing with radial interference against the said surface portion, the said substantially cylindrical surface portion being connected towards the top to a shoulder against which the lip can bear if the two cups become radially eccentric relative to one another.

8 Claims, 5 Drawing Sheets

(51) Int. Cl.
*F16C 19/10* (2006.01)
*F16C 33/76* (2006.01)
*F16C 35/04* (2006.01)

(56) References Cited

U.S. PATENT DOCUMENTS

| | | | |
|---|---|---|---|
| 5,487,535 A * | 1/1996 | Carter et al. | 267/220 |
| 6,257,605 B1 * | 7/2001 | Zernickel et al. | 280/124.147 |
| 6,267,512 B1 * | 7/2001 | Beghini et al. | 384/609 |
| 6,550,755 B2 * | 4/2003 | Ehrhardt et al. | 267/286 |
| 6,558,043 B2 * | 5/2003 | Beghini et al. | 384/615 |
| 6,814,496 B2 * | 11/2004 | Beghini et al. | 384/617 |
| 6,948,728 B2 * | 9/2005 | Pflügner et al. | 280/124.147 |
| 7,811,005 B2 * | 10/2010 | Beghini et al. | 384/609 |
| 7,837,016 B2 * | 11/2010 | Chamousset et al. | 188/321.11 |
| 2002/0003913 A1 * | 1/2002 | Beghini et al. | 384/609 |
| 2005/0008276 A1 * | 1/2005 | Beghini et al. | 384/609 |
| 2005/0011718 A1 * | 1/2005 | Arnault | 192/98 |
| 2005/0089255 A1 * | 4/2005 | Debrailly et al. | 384/609 |
| 2007/0267793 A1 * | 11/2007 | Chamousset et al. | 267/220 |
| 2008/0048370 A1 * | 2/2008 | Corlet et al. | 267/220 |
| 2011/0291337 A1 * | 12/2011 | Viault et al. | 267/220 |
| 2012/0257849 A1 * | 10/2012 | Corbett et al. | 384/607 |

FOREIGN PATENT DOCUMENTS

| | | |
|---|---|---|
| EP | 1555144 A2 | 7/2005 |
| FR | 2783204 A1 | 3/2000 |
| FR | 2857906 A1 | 1/2005 |

* cited by examiner

SUSPENSION BUMP STOP AND STRUT DEVICE

BACKGROUND OF THE INVENTION

The present invention relates to the field of suspension bump stop devices used in particular in motor vehicles in the suspension struts of the steered wheels.

The invention relates more specifically to a suspension bump stop device comprising an upper ring and a lower ring between which rolling elements, for example balls or rollers, are positioned. The upper and lower rings are generally mounted in contact with lower and upper bearing or support pieces, such as caps or cups. The upper and lower support cups form a housing for the rings of the rolling bearing and provide the interface between the said rings and the surrounding elements.

A suspension bump stop is positioned in the upper part of the suspension strut between the vehicle bodyshell and a suspension spring. The spring is installed around the piston rod of a shock absorber the end of which is connected to the vehicle bodyshell via an elastic block that filters out vibrations. The suspension spring bears axially, either directly or indirectly, on the lower cup. The upper cup for its part is fixed relative to the vehicle bodyshell.

The suspension bump stop allows axial force to be transmitted between the suspension spring and the vehicle bodyshell while at the same time allowing a rotational movement between the lower cup and the filtering elastic block. This relative angular movement results from a turning of the steered wheels of the vehicle and/or from the compression of the suspension spring. The upper and lower cups are able adequately to transmit axial load between the raceways and the cups. They have bearing surfaces that provide good load distribution. Means incorporated into the said cups may also provide axial retention of the various elements of the suspension bump stop and provide means of sealing.

In numerous motor vehicle strut devices, the seat on which the suspension spring bears via its lower end, on the opposite side to the suspension bump stop, is inclined with respect to the axis so that the line of force applied by the spring to the lower cup of the suspension bump stop makes an angle with respect to the axis of the shock absorber. One example of a device of this type is illustrated in patent application FR 2 783 204.

This results in radial forces applied by the spring to the lower cup of the suspension bump stop. These radial forces may cause the lower cup to shift slightly in a radial direction with respect to the upper cup.

Now, the sealing of the bump stop between the two cups is often afforded by soft sealing lips which bear against rubbing bearing surfaces. Because the suspension bump is under the bodywork of the vehicle, near the wheel, it is particularly exposed to being splashed with water. It is therefore necessary for the sealing to be particularly effective.

Patent application FR-A-2 857 906 recommends embedding a metal reinforcing insert in the lower cup. However, the suspension bump stop of that document has the disadvantage of providing only a simple narrow passage between an upper cap and the lower support cap that supports the rolling bearing in order to seal the bump stop.

As a result, under certain conditions, for example when the vehicle is driving along a flooded road surface or alternatively when the vehicle is being cleaned with a high-pressure jet wash, there may be some ingress of water into the rolling bearing with detrimental effects on bearing life.

In addition, in the event of eccentricity of loading as in a device as illustrated by patent application FR 2 783 204 mentioned hereinabove, the sealing means provided on the cups are liable no longer to come into contact with their bearing surface, at least in certain regions, thus reducing the sealing.

It might be possible to increase the radial geometric interference between the lips and their bearing surfaces in order to overcome this problem but that would have the disadvantage of excessively increasing the frictional torque of the bump stop.

SUMMARY OF THE INVENTION

An object of the present invention is a suspension bump stop the sealing characteristics of which are improved in all operating configurations, especially in the event of relative radial movement of the bump stop rolling bearing support cups without leading to an increase in the frictional torque of the bump stop.

Another subject of the present invention is a robust suspension bump stop capable of withstanding relatively high axial loading while at the same time able to reduce any potential ingress of water or other contaminants.

A further object of the present invention is to propose a suspension bump stop that is particularly reliable over time.

To this end, according to one embodiment, a suspension bump stop device comprises a rolling bearing that forms an axial bump stop, equipped with an upper ring, with a lower ring and with a plurality of rolling elements positioned between the rings, the upper and lower rings being supported respectively by an upper cup and a lower cup. The lower cup forms a bearing means for a suspension spring, at least one sealing lip being provided on one of the cups so that it bears against a bearing surface portion of the other cup. The bearing surface portion is substantially cylindrical. The sealing lip is directed downwards away from the rolling bearing and bears with radial interference against the said surface portion. The said substantially cylindrical surface portion is connected towards the top to a shoulder against which the lip can bear if the two cups become radially eccentric relative to one another.

In this way, bump stop sealing is maintained even when the cups have shifted radially relative to one another. The sealing lip or lips in fact remain in rubbing contact with the shoulder even when they are no longer in contact with the substantially cylindrical surface portion.

In one embodiment, at least one external sealing lip is supported by the lower cup. The bearing surface portion for the external sealing lip may be situated on a radially internal wall of a skirt of the upper cup.

In another embodiment, which may be combined with the first one, at least one internal sealing lip is supported by the lower cup.

In all cases, the shoulder may exhibit a substantially radial surface, a substantially frustoconical surface or, alternatively, a substantially toroidal surface, the essential point being that the sealing lip can come into rubbing contact without any sudden jerking movement if a relative radial shift of the cups interrupts contact with the cylindrical bearing surface.

In one advantageous embodiment, the lower cup that forms a bearing means for a suspension spring comprises a body and a reinforcing insert at least partially covered by the said body, the body being formed of a part made of a rigid material and of a part made of a soft material comprising the said sealing lip.

The soft material is preferably overmoulded at least partially over the rigid material and at least partially over the reinforcing insert. Preferably also, the soft material comprises an elastomeric material.

The invention applies in particular to a motor vehicle strut comprising a shock absorber and a suspension bump stop device.

The present invention will be better understood with the aid of the detailed description of one embodiment taken by way of entirely nonlimiting example and illustrated by the attached drawings, in which:

BRIEF DESCRIPTION OF THE SEVERAL VIEWS OF THE DRAWINGS

The present invention will be better understood with the aid of the detailed description of one embodiment taken by way of entirely nonlimiting example and illustrated by the attached drawings, in which.

DETAILED DESCRIPTION OF THE INVENTION

Figure 1:
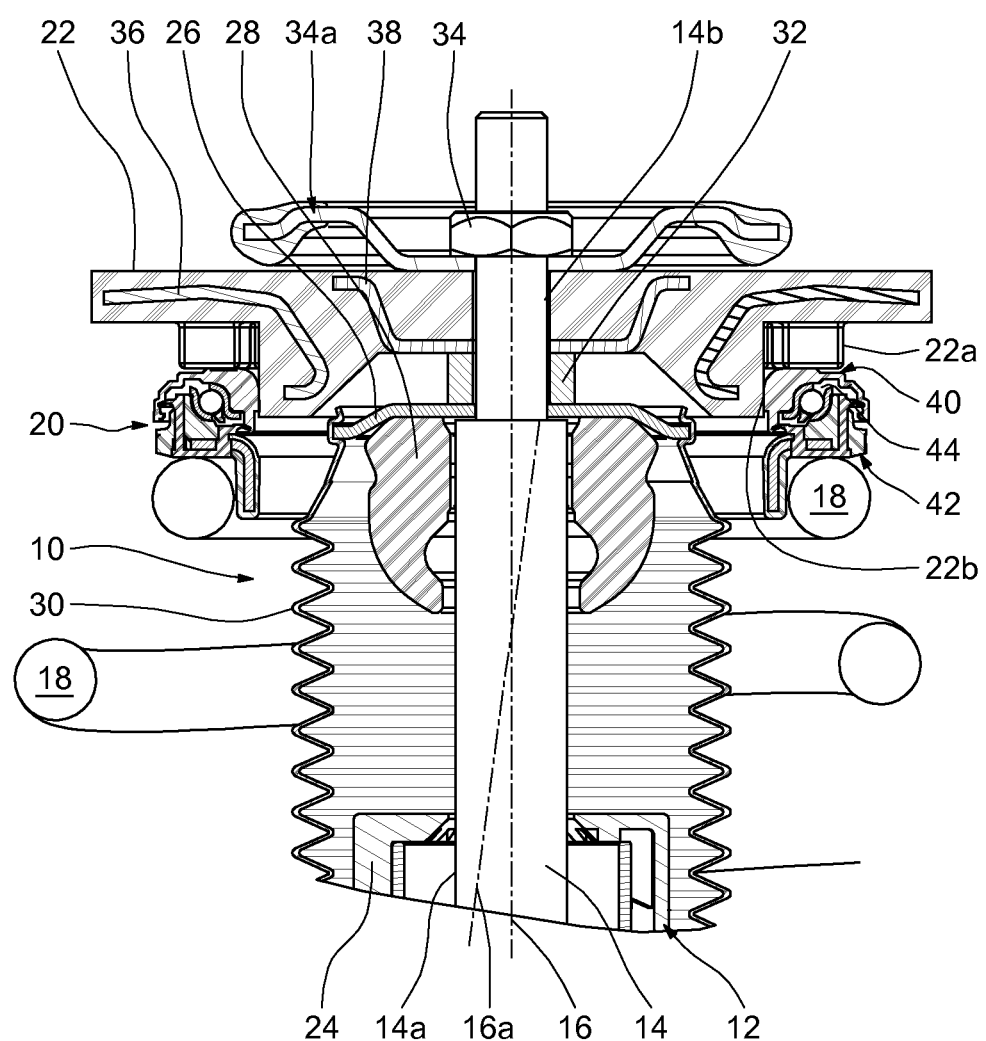
FIG. 1 is a view in axial section of a suspension bump stop device mounted in a motor vehicle strut according to one embodiment of the invention.

As can be seen from FIG. 1, a strut referenced 10 overall is provided with a shock absorber 12 comprising a rod 14 of axis 16, with a spring 18, with a suspension bump stop 20 mounted around the rod 14 and with a filtering elastic block 22 positioned between the bump stop 20 and the bodyshell (not depicted) of a motor vehicle in which the strut 10 is mounted. FIG. 1 also depicts the line of force 16a exerted by the spring 18. This line of force 16a makes an angle with the axis 16 of the suspension device because of the way (not depicted in the figure) the lower end of the spring 18 is mounted on a seat that is inclined with respect to the axis 16 as described for example in patent application FR 2 783 204.

The shock absorber 12 also comprises a shock absorber cylinder 24 depicted in part. The rod 14 of the shock absorber has a large-diameter portion 14a, a small-diameter portion 14b, the said portions being separated by a radial shoulder 14c. The shock absorber 12 further comprises a plate 26 mounted around the small-diameter portion 14b and coming to bear against the shoulder 14c. Fixed by any appropriate means to the plate 26 is a shock-absorbing pad of annular overall shape. The shock-absorbing pad 28, for example made of rubber or of elastomer, is positioned around the large-diameter portion 14a. A protective gaiter 30 is attached to the plate 26 in such a way that it surrounds and protects the various elements that make up the shock absorber 12.

The strut 10 also comprises an axial spacer piece 32 positioned radially around the small-diameter portion 14b of the rod 14 and bearing axially against the plate 26 and the elastic block 22. There is also a nut 34 to collaborate with a corresponding threaded portion of the portion 14b of the rod 14 so as both to clamp the elastic block 22 against the spacer piece 32 and to clamp the said elastic block 22 against the suspension bump stop 20. A mounting flange 34a is also clamped against the elastic block 22 by the nut 34.

The elastic block 22 may be made of a soft material, such as an elastomer, in which there may be, optionally, inserted one or more rigid inserts, for example metal inserts. In the embodiment depicted, two inserts 36, 38 of annular overall shape are provided inside the elastic block 22. The large-diameter insert 36 is completely embedded in the elastic block 22, while the small-diameter insert 38 is partially embedded in the said block, a radial part bearing against the spacer piece 32.

As illustrated more clearly in FIGS. 2 to 5, the suspension bump stop 20 mainly comprises an upper bearing cap or cup 40 in contact with the elastic block 22, a lower support cap or cup 42 that forms a bearing means for the spring 18 and a rolling bearing 44 positioned axially between the two cups.

The upper cup 40 may consist of a one-piece part made of plastic, for example of nylon-6,6 which may or may not be reinforced with glass fibre. The bearing cup 40 comprises an upper radial surface 40a in contact with an annular portion 22a of the elastic block 22 comprising a plurality of radial ribs, a small-diameter axial surface 40b extending downwards, from a small-diameter end of the radial surface 40a, and centred on an axial portion 22b of the elastic block 22. The axial portion 22b is radially offset towards the inside with respect to the annular rib 22a. The upper bearing cup 40 also comprises an internal annular axial skirt 40c of small thickness positioned more or less in the continuation of the axial surface 40b, directed downwards.

The upper bearing cup 40 further comprises an external annular axial skirt 40d of small thickness and large diameter connected to the upper radial surface 40a via a frustoconical surface that extends in an inward direction an upper end of the said skirt, itself extended inward to a small-diameter edge by a radial surface from which there extends axially upwards an axial surface, itself extended inward at an upper end by a radial surface. An inwardly directed radial protrusion 40e, which may be circumferentially continuous or discontinuous, is formed on the internal edge of the external axial skirt 40d near its lower end. In this instance, the radial protrusion 40e is circumferentially continuous and forms a rib facing radially inwards towards the lower support cup 42.

The rolling bearing 44 comprises an upper ring 46 and a lower ring 48 obtained from a pressed metal sheet, between which rings a row of rolling elements 50, here in the form of balls, is housed. There is also a cage 52 to maintain a uniform circumferential spacing between the rolling elements 50. The rolling elements 50 are positioned between raceways formed by the upper 46 and lower 48 rings. Advantageously, the said rings may be obtained from one and the same sheet metal blank by cutting and pressing, thanks to the fact that the outside diameter of the upper ring 46 is substantially equal to the inside diameter of the lower ring 48.

Figure 4:
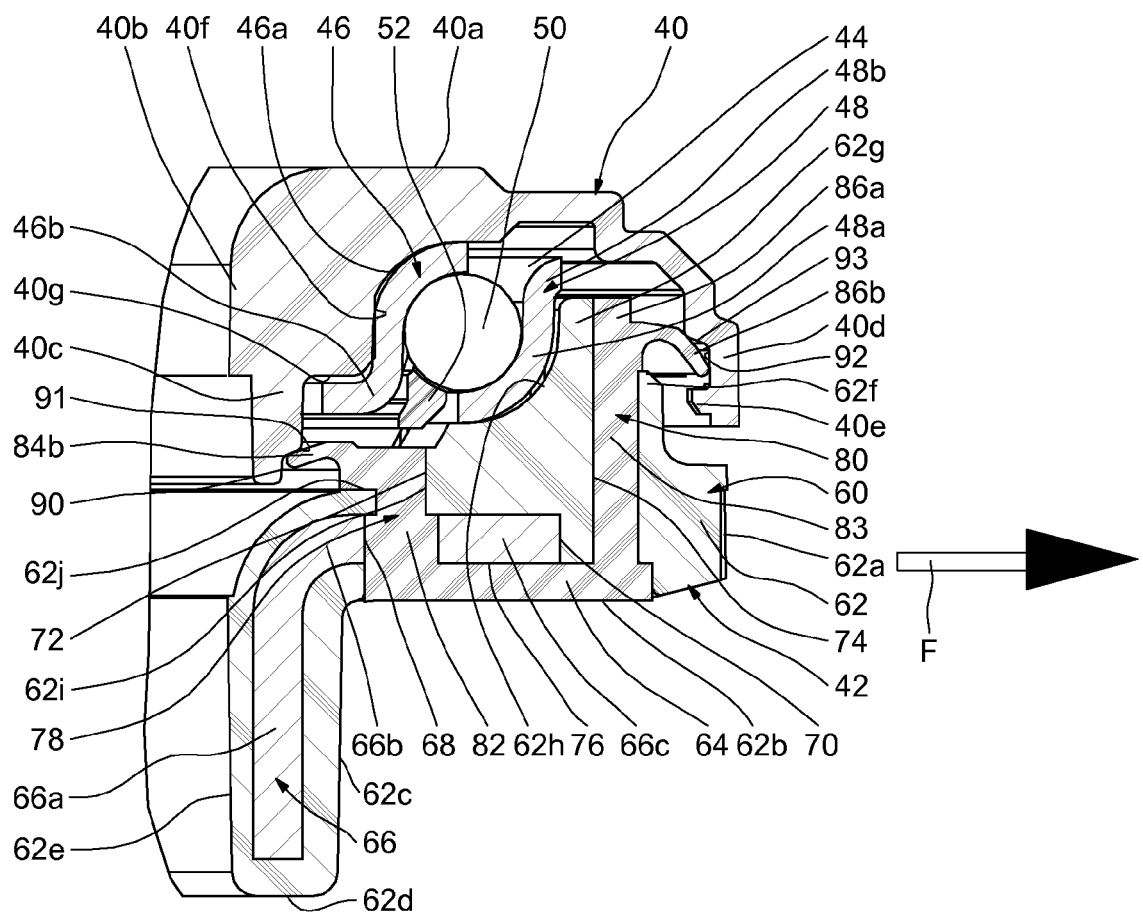
FIG. 4 shows the position of the external sealing lip in the region where the gap between the two cups is reduced as a result of eccentricity.

As can be seen best in the enlarged view of FIG. 4, the upper ring 46 has a toroidal portion 46a in contact with a complementary surface 40f of the bearing cap 40, said toroidal portion 46a being extended inwards by a toroidal portion 46b of the opposite concavity extending near a circumferentially continuous or discontinuous annular radial surface 40g and connected to the surface 40f and to the internal axial skirt 40c. The outer surface of the toroidal portion 46a forms the raceway for the rolling elements 50.

The lower ring 48 also has a toroidal portion 48a of which the concave interior surface forms a raceway for the rolling elements 50 and comes into contact with the lower support cup 42. The toroidal portion 48a is extended outwards by a toroidal portion 48b of the opposite concavity. The cage 52 is positioned axially between the toroidal portion 46b and the toroidal portion 48a.

The lower support cup 42 mainly comprises a body 60 formed of a rigid material 62 and of a soft material 64, and a reinforcing insert 66 that reinforces the said body to give it sufficient rigidity and allow adequate transmission of axial and radial load between the spring 18 and the rolling bearing 44.

The rigid material 62 of the body 60 may for example be made of a plastic such as a nylon-6,6 which may or may not be charged with glass fibre. The rigid material 62 has a cylindrical axial exterior surface 62a of small axial dimension, from the lower end of which there extends an annular surface 62b which is extended inwards and downwards by an axial surface 62c. The axial surface 62c is for centring the spring 18, while the radial surface 62b forms a bearing surface for the said spring.

Extending inwards from the lower end of the axial surface 62c there is a radial annular surface 62d which is extended axially upwards from a small-diameter edge by an axial surface 62e that forms the bore of the lower support cup 42.

Starting from the upper end of the axial outer surface 62a, the rigid material 62 of the body 60 further comprises first and second axial annular portions 62f, 62g extending axially towards the bearing cap 40. The upper end of the large-diameter first axial portion 62f is axially set back in a downwards direction with respect to the upper end of the second axial portion 62g. The axial portion 62g radially surrounds the toroidal portion 48b of the lower ring 48. The upper end of the portion 62g is extended inwards by a surface 62h in contact with the toroidal portion 48a of the lower ring 48 and of a shape that complements the said portion 48a. The toroidal surface 62h is extended inwards by a frustoconical surface from which there extends an axial surface 62i which is extended, radially inwards at a lower end, by an annular radial surface 62j which is connected to the axial surface 62e by a rounded surface.

The reinforcing insert 66, of annular overall shape, has the overall shape of an L in cross section. It comprises an axial portion 66a which is extended, outwards from an upper end, by a rounded portion 66b from which there extends radially outwards a radial portion 66c. The reinforcing insert 66 may be obtained by cutting and pressing from a sheet metal blank that is relatively thick in order to guarantee satisfactory rigidity.

The axial 66a and rounded 66b portions are completely embedded within the rigid material 62 of the body 60. The axial portion 66a extends axially between a region situated near the radial annular surface 62d as far as a region situated at the radial surface 62b. The radial portion 66c extends radially between a region situated at the toroidal portion 46b of the upper ring 46 as far as a region situated at the toroidal region 48b of the lower ring 48. The reinforcing insert 66 thus allows the lower support cup 42 to transmit to the rolling bearing 44 the axial and radial loadings applied by the spring 18.

The reinforcing insert 66 comprises a plurality of through-holes 68 formed in the radial portion 66c in close proximity to the rounded portion 66b. The holes 68, of which there are ten here, are uniformly distributed in the circumferential direction. The reinforcing insert 66 further comprises a plurality of notches 70 formed from the free edge of the radial portion 66c. The notches 70 are of concave overall shape and are positioned in such a way that each hole 68 is radially aligned with a notch 70. Each notch 70 is therefore positioned in the same radial plane as one of the holes 68.

In this embodiment, the rigid material 62 of the body 60 is overmoulded over the reinforcing insert 66, these two elements thus being firmly secured to one another. As the rigid material 62 is being overmoulded, axial passages 72 and 74 (FIG. 4) are created, the first series of passages 72 passing through the holes 68 in the reinforcing insert 66 and the second series of passages 74 passing through the notches 70 so that an internal axial passage 72 lies in the same radial plane as an external passage 74. The axial passages 72 and 74 are created in such a way that the rigid material 62 can cover the bore of each hole 68 and the edge delimiting each notch 70. Each internal passage 72 is connected to the associated external passage 74 by a non-blind or open radial passage 76 created under the radial portion 66c of the reinforcing insert 66. As an alternative, the rigid material 62 could be overmoulded onto the insert in such a way that it does not cover the inside of the holes 68.

The soft material 64 of the body 60 is then overmoulded over the reinforcing insert 66 and the rigid material 62 to form internal 78 and external 80 seals. The soft material 64 may be made of elastomer, for example of synthetic rubber such as polyurethane.

Thanks to the passages 72 and 74 which run axially through the reinforcing insert 66 and are interconnected by the radial passages 76, the soft material 64 can be overmoulded using a low number of injection points, the molten soft material then spreading out in the manufacturing mould to form the seals 78, 80. The structure of the manufacturing mould is thus simplified.

In other words, the holes 68 and the notches 70 of the reinforcing insert 66 form passageways that have a dual function, namely that of allowing the transfer and flow of the soft material 64 between two opposing surfaces of the insert 66 at the time of manufacture of the support cap 42, and also of ensuring firm attachment of the soft material 64 to the said insert. The overmoulding of the two different materials of the body 60 is therefore performed in two successive steps that can be performed using different techniques, for example simple overmoulding or alternatively two-shot injection moulding.

Making the body 60 from two distinct materials makes it possible to obtain a lower support cup 42 capable effectively of performing various mechanical functions. Of course, it will be appreciated that it might also be possible to produce the body 60 with a greater number of materials.

The internal seal 78 comprises a plurality of internal axial studs or bridges 81, here ten of them, formed inside the passages 72 of the rigid material 62. Each internal stud 81 extends axially from a region situated near the radial surface 62b as far as the level of the opposite radial surface 62j. Each stud 81 therefore passes axially right through the reinforcing insert 66, being radially surrounded with rigid material 62. In other words, at each hole 68 in the reinforcing insert 66, some of the rigid material 62 is situated radially between some of the soft material 64 and the radial portion 66c of the reinforcing insert 66.

The seal 78 is also equipped with an annular heel 84a covering the radial surface 62j and connected to all the studs 81, and with a relatively slender annular internal sealing lip 84b projecting inwards from the heel 84a. The sealing lip 84b comes into rubbing contact with the exterior surface of the internal axial skirt 40c of the upper bearing cap 40. It is curved downwards, that is to say away from the rolling bearing 44. The sealing lip 84b comes to bear with radial interference against a substantially cylindrical surface portion 90 (FIGS. 2 and 4) of the axial skirt 40c. This surface portion 90 is positioned near the lower end of the axial skirt 40c and is connected, upwards, towards the rolling bearing 44, by a rounded portion, to a shoulder 91 against which the lip 84b can also bear. In the embodiment illustrated, the shoulder 91 is substantially frustoconical and widens towards the top, as can best be seen in FIGS. 4 and 5, thus mirroring the downwardly curved shape of the lip 84b.

The external seal 80 also comprises ten axial external studs 83 formed inside the passages 74 of the rigid material 62. Each external stud 83 extends axially from a region near the radial surface 62b as far as the upper end of the axial portion 62f. Each stud 83 passes axially right through the reinforcing insert 66, being radially surrounded with rigid material 62. Thus, at the edge delimiting each notch 70 in the reinforcing insert 66, some of the rigid material 62 is situated radially between some of the soft material 64 and the radial portion 66c of the reinforcing insert 66.

The seal 80 is further provided with an annular heel 86a covering the upper end of the axial portion 62f and the external lateral surface of the axial portion 62g and connected to all the studs 83. The seal 80 also comprises a relatively slender annular external sealing lip 86b originating in the heel 86a and projecting outwards. The sealing lip 86b provided on the body 60 of the lower cup 42 comes into rubbing contact with the bore of the external skirt 40d of the upper bearing cup 40. It is curved downwards. The sealing lip 86b comes to bear against a substantially cylindrical surface portion 92 of the axial skirt 40d of the upper cup 40. The surface 92 is connected, towards the top, in the direction of the rolling bearing 44, by a rounded portion, to a shoulder 93, here of substantially frustoconical shape and widening towards the top. The sealing lip 86b may also bear against this shoulder 93.

The studs 81, 83 situated in one and the same radial plane are interconnected by a radial connecting bead 82 formed by one of the radial passages 76. Each bead 82 comes into direct contact with the radial portion 66c of the reinforcing insert 66 and opens onto the radial surface 62b. The reinforcing insert 66 is entirely covered with the rigid material 62 and the soft material 64. In other words, the reinforcing insert 66 is completely embedded within the body 60.

The internal 78 and external 80 seals perform a static sealing function sealing against the lower support cup 42 and a dynamic sealing function sealing against the upper bearing cup 40.

The downward curvature of the internal 84b and external 86b sealing lips is particularly advantageous in so far as that increases their ability to repel any splashes of water or other pollutants. The lips 84b, 86b therefore act as particularly effective deflectors. Furthermore, in the event of such splashes, the pressure of contact between the lips and the upper bearing cup 40 increases, thus further improving the effectiveness of the said lips.

Furthermore, the sealing lip 86b also plays a part in axially retaining the upper bearing cup 40 before the bump stop is mounted. Specifically, the sealing lip 86b has an outside diameter greater than the diameter of the rib 40e and is positioned above the latter in such a way as to be able to interfere diametrally with the said rib in the event that the support cup 42 and the bearing cup 40 begin to separate before the bump stop has been mounted in the assembly for which it is intended. The sealing lip 86b therefore also acts as a means of axially retaining the upper bearing cup 40 relative to the lower support cup 42.

The downward orientation of the sealing lip 86b makes it easier to deform as the parts are being mounted while at the same time ensuring sufficient axial retention that the assembly thus formed can be handled and transported without any risk of accidental disassembly.

Finally, the special structure of the respective bearing surfaces of the external skirt 40d and of the internal skirt 40c makes it possible to maintain excellent sealing even in the event of relative eccentricity between the upper and lower cups.

Figure 2:
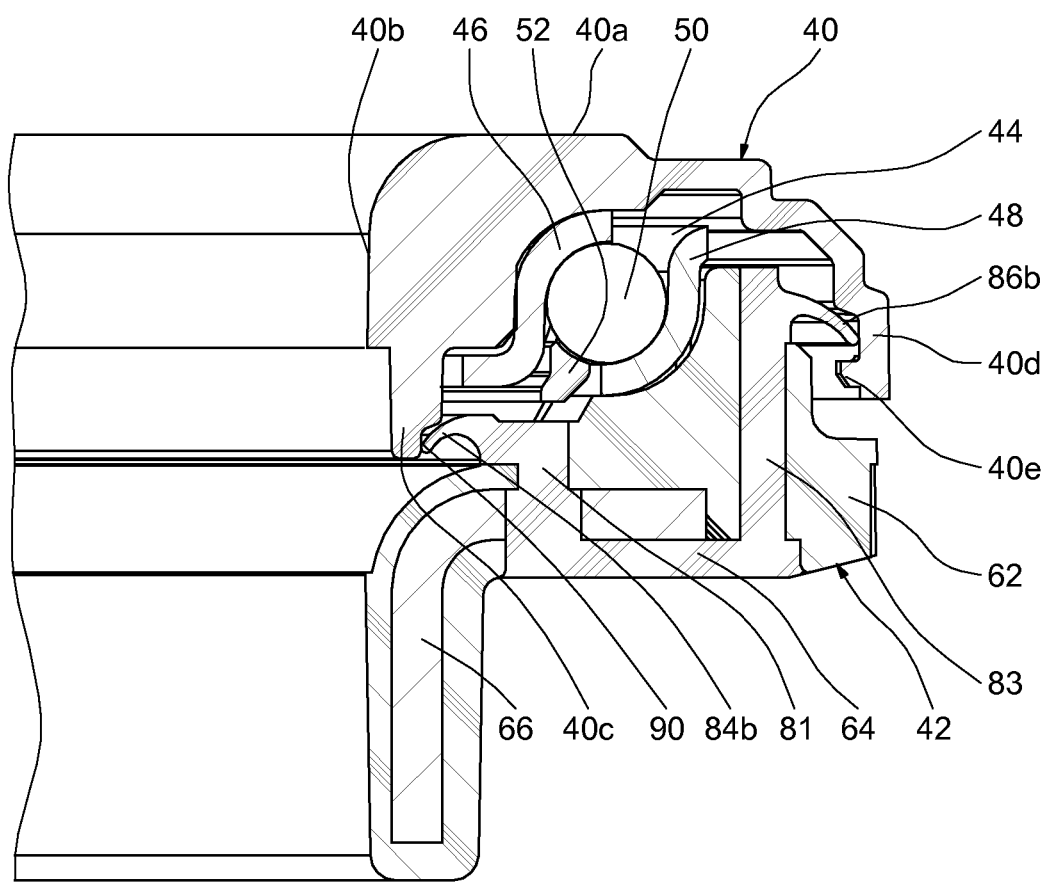
FIG. 2 is an enlarged view showing the position of the sealing lips when the bump stop is operating with no eccentricity between the two cups.
Figure 3:
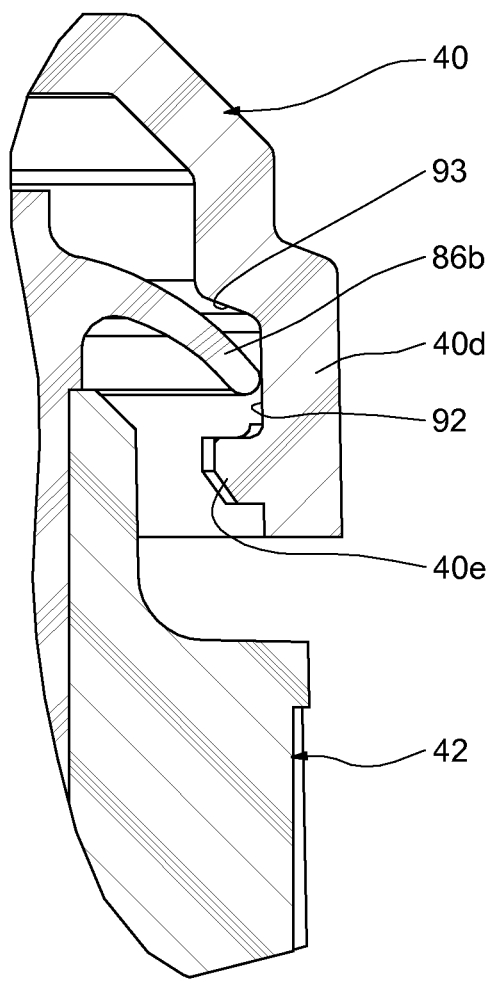
FIG. 3 is an enlarged view showing the position of the external lip with no eccentricity when the bump stop is assembled but before it is mounted in the suspension device.

In the configuration in which the bump stop has been assembled but has not yet been mounted in the suspension device, as illustrated in FIGS. 2 and 3, the lip 86b is in bearing contact with only the substantially cylindrical surface 92 of the skirt 40d of the upper cup 40. It will be noted that in the free state, the diameter of the lip 86b is greater than the bore diameter of the skirt 40d of the upper cup. The internal lip 84b is in contact only with the substantially cylindrical surface 90 of the skirt 40c of the upper cup 40. In the free state, the diameter of the lip 84b is less than the outside diameter of the skirt 40c.

Figure 5:
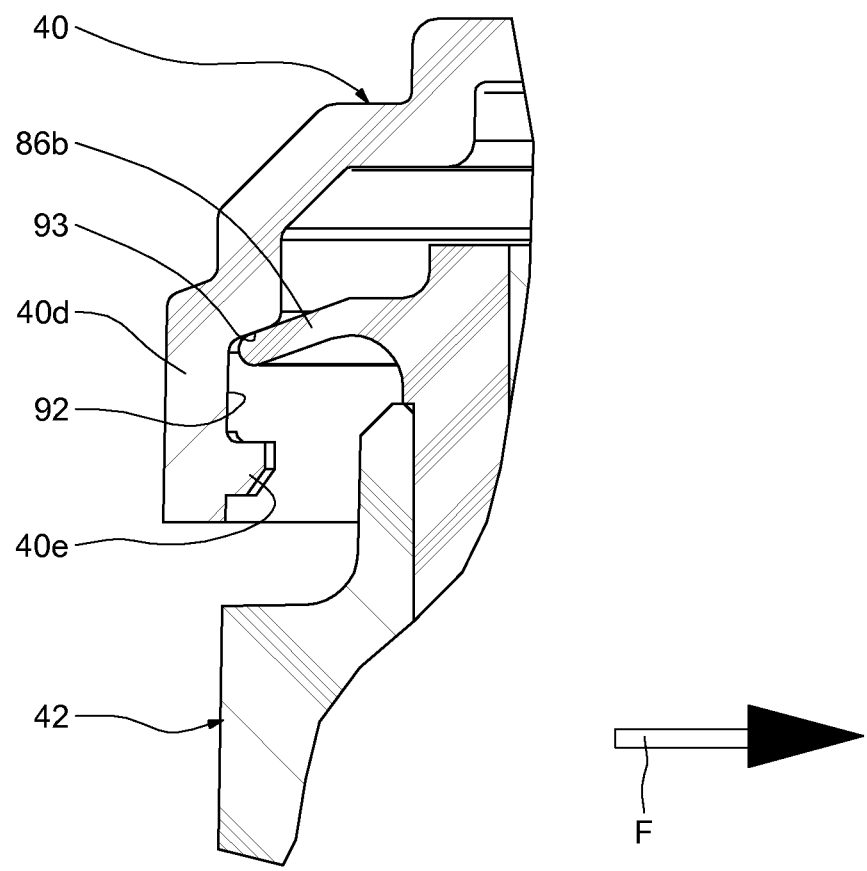
FIG. 5 shows the position of the external and internal sealing lips in the region where the gap between the two cups is increased as a result of eccentricity.

In the event of eccentricity, the lower cup shifts for example to the right in FIGS. 4 and 5 in the direction of the arrows F. FIG. 4 shows the position of the sealing lip 86b in the region where the gap between the upper 40 and lower 42 cups is reduced as a result of the relative eccentricity of the two cups 40 and 42. In this position and in this region, the external lip 86b comes to bear both against the substantially cylindrical surface 92 and against the shoulder 93. Conversely, the internal sealing lip 84b, which was in contact with the substantially cylindrical surface 90 of the skirt 40c when there was no eccentricity, comes into contact only with the shoulder 91 because of the local increase in the size of the gap in this region. Transition from one position to another occurs without any jerkiness because of the rounded portion that connects the shoulder 91 to the cylindrical surface 90.

FIG. 5 shows the position of the sealing lip 86b of the lower cup 42 in the region in which the gap between the two cups 40 and 42 is increased as a result of eccentricity. This eccentricity in fact has caused the lower cup 42 to move to the right in FIG. 5, in the direction of the arrow F. FIG. 5 thus corresponds to FIG. 4, the two figures being two partial sections through the suspension device, in the same axial plane and in the same eccentric position. As can be seen in FIG. 5, the end of the lip 86b is no longer in contact with the substantially cylindrical surface 92 but has come into contact as a result of elasticity with the shoulder 93 of the upper cup 40. Transition from one position to another occurs without jerkiness thanks to the rounded portion that connects the shoulder 93 to the cylindrical surface 92.

The sealing lips 86b and 84b thus continue to ensure effective sealing even in the event of eccentricity, any water splashes having the effect of strengthening the contact between the lips of the lower cup and their bearing surface provided on the upper cup, whether these be the cylindrical surfaces 92 or 90 or the shoulders 93 or 91.

Thanks to this special structure of the sealing means that have just been described, it is possible to afford effective sealing with a low frictional torque, even under conditions of severe eccentricity and with a great deal of splashed water.

Although in the example illustrated, the sealing lips were provided on the lower cup, it would also be possible, with no major modification, to conceive of a device in which the sealing lips are provided on the upper cup.

The invention claimed is:
1. A suspension bump stop device for a strut, the strut including a spring with a line of force, the suspension bump device comprising:

a rolling bearing configured to form an axial bump stop and including an upper ring, a lower ring, and a plurality of rolling elements positioned between the upper ring and the lower ring, an upper cup supporting the upper ring and formed of a first rigid material part, a lower cup supporting the lower ring and forming a bearing means for the suspension spring such that the line of force defines an angle with an axis of the suspension bump stop device, the lower cup comprising:

a body formed of a second rigid material part and of a soft material part;

a reinforcing insert at least partially covered by the second rigid material part of the body, the reinforcing insert having at least one passage therethrough, the soft material part being overmoulded at least partially over the reinforcing insert and extending through the at least one passage therethrough, at least one external sealing lip provided on the lower cup and formed by the soft material part thereof, the at least one external sealing lip maintaining a seal between the upper cup and the lower cup by contacting the first rigid material part of the upper cup, the soft material part of the lower cup also forming an internal sealing lip contacting the first rigid material part of the upper cup, and a substantially cylindrical bearing surface portion provided on the upper cup, the at least one external sealing lip being directed downwards away from the rolling bearing and contacting against and forming the seal with the cylindrical bearing surface portion in such a manner that upward pressure on the at least one external sealing lip strengthens the seal by increasing a pressure of contact by the at least one external sealing lip onto the first rigid material part of the cylindrical bearing surface, the upper cup further having a shoulder connected with and adjacent to the substantially cylindrical surface portion and against which the at least one external sealing lip can bear if the upper and lower cups become radially eccentric relative to one another.

2. The suspension bump stop device according to claim 1, wherein at least one external sealing lip is supported by the lower cup.

3. The suspension bump stop device according to claim 2, wherein the upper cup has a skirt with a radially internal wall and the bearing surface portion for the external sealing lip is situated on the radially internal wall of the skirt.

4. The suspension bump stop device according to claim 1, wherein at least one internal sealing lip is supported by the lower cup.

5. The suspension bump stop device according to claim 1, wherein the shoulder has a substantially radial surface.

6. The suspension bump stop device according to claim 1, wherein the shoulder has a substantially frustoconical surface.

7. The suspension bump stop device according to claim 1, wherein the shoulder has a substantially toroidal surface.

8. A motor vehicle strut comprising:

a shock absorber including a spring having a line of force, and a suspension bump stop device including a rolling bearing configured to form an axial bump stop and including an upper ring, a lower ring and a plurality of rolling elements positioned between the upper ring and the lower ring, an upper cup formed of a first rigid material part and supporting the upper ring, a lower cup supporting the lower ring and forming a bearing means for the suspension spring such that the line of force defines an angle with an axis of the suspension bump stop device, the lower cup comprising:

a body formed of a second rigid material part and of a soft material part;

a reinforcing insert at least partially covered by the second rigid material part of the body, the reinforcing insert having at least one passage therethrough, the soft material part being overmoulded at least partially over the reinforcing insert and extending through the at least one passage therethrough, at least one external sealing lip provided on the lower cup and formed by the soft material part thereof, the at least one external sealing lip maintaining a seal between the upper cup and the lower cup by contacting the first rigid material part of the upper cup, the soft material part of the lower cup also forming an internal sealing lip contacting the first rigid material part of the upper cup, a substantially cylindrical bearing surface portion provided on the upper cup, the at least one external sealing lip being directed downwards away from the rolling bearing and contacting against and forming the seal with the cylindrical bearing surface portion in such a manner that upward pressure on the at least one external sealing lip strengthens the seal by increasing a pressure of contact by the at least one external sealing lip onto the cylindrical bearing surface, the upper cup further having a shoulder connected with and adjacent to the substantially cylindrical surface portion and against which the at least one external sealing lip can bear if the upper and lower cups become radially eccentric relative to one another.

\* \* \* \* \*